United States Patent [19]

Maki, Jr.

[11] Patent Number: 4,709,357

[45] Date of Patent: Nov. 24, 1987

[54] METHOD AND APPARATUS FOR ACOUSTICALLY INVESTIGATING A BOREHOLE CASING CEMENT BOND

[75] Inventor: Voldi E. Maki, Jr., Austin, Tex.

[73] Assignee: Gearhart Industries, Inc., Fort Worth, Tex.

[21] Appl. No.: 765,914

[22] Filed: Aug. 14, 1985

[51] Int. Cl.$^4$ ............................................. G01U 1/00
[52] U.S. Cl. ..................................... 367/35; 367/45; 181/105
[58] Field of Search ...................... 367/35, 45, 43, 13, 367/49, 46; 181/105; 364/421, 422

[56] References Cited

U.S. PATENT DOCUMENTS

| | | | |
|---|---|---|---|
| 2,648,056 | 8/1953 | Jakosky | 367/35 |
| 4,255,798 | 3/1981 | Havira | 367/35 |
| 4,403,298 | 9/1983 | May, Jr. | 364/724 |
| 4,587,641 | 5/1986 | DiFoggio | 367/35 |

OTHER PUBLICATIONS

Feintuch et al, "Time Delay Estimation Using the LMS Adaptive Filter-Dynamic Behavior", IEEE Transactions on Acoustics, Speech, and Signal Processing, vol. ASSP-29, No. 3, Jun. 1981, pp. 571-576.

Primary Examiner—Thomas H. Tarcza
Assistant Examiner—Daniel T. Pihulic
Attorney, Agent, or Firm—Hubbard, Thurman, Turner & Tucker

[57] ABSTRACT

A method and apparatus are disclosed for acoustically investigating a borehole casing cement bond. A sonde is provided which is adapted to be lowered into a borehole and which includes a plurality of acoustic transducers arranged in a helical array around the sonde. A short duration acoustic pulse is directed at the borehole casing from each transducer and the reflection signal generated thereby is coupled to an autoregressive adaptive filter which automatically adjusts its filter coefficients to achieve a desired output signal. The adjusted filter coefficients are then utilized to determine the frequency and decay rate of the reflection signal and the frequency and decay rate of the reflection signal may be utilized to determine selected characteristics of the casing and the cement bond. In a preferred embodiment of the present invention, an additional transducer is mounted a selected distance from a fixed reflector to obtain standard transmission characteristics.

18 Claims, 9 Drawing Figures

METHOD AND APPARATUS FOR ACOUSTICALLY INVESTIGATING A BOREHOLE CASING CEMENT BOND

BACKGROUND OF THE INVENTION

This invention relates to methods and apparatus for acoustic well logging in general and in particular to acoustic methods and apparatus for measuring well casing thickness and the quality of the cement bond holding the casing in place.

In the completion of a borehole which has been drilled into the earth in search of petrochemicals, it is common to insert a length or "string" of casing or pipe into the borehole and then "set" the casing by forcing cement into the annulus between the borehole and the casing. This technique is often utilized to separate oil and gas producing zones from each other and also from water bearing strata.

It is known in the art that cement in such an application sometimes fails to provide the desired separation and permits fluids under pressure in one zone to migrate to a second zone. Migration of water into a producing zone is a particularly undesirable occurrence and can possibly render a well unproductive.

Acoustic techniques have long been proposed to determine the quality of the bond between the cement and casing. In one example, Synnott III, U.S. Pat. No. 3,401,773, there is disclosed a technique which utilizes a longitudinally spaced sonic transmitter and receiver. A later portion of the reflection signal generated in Synnott III is integrated and the total amount of energy present in this signal is utilized to provide a measure of the presence or absence of cement. Synnott III exhibits several dificiencies, most notably the inability of the system to provide precise measurement due to the separation of transmitter and receiver and also the system's failure to provide circumferential resolution around the periphery of the casing.

Another technique for evaluating cement bond condition is disclosed in Ingram, U.S. Pat. No. 3,697,937. Ingram discloses the utilization of a sonic transmitter/receiver with zero spacing therebetween in order to enhance the precision of measurements obtained. Ingram utilizes the relative amplitude and phase of reflected sonic energy to evaluate the cement bond.

Further attempts at acoustic investigation of a cased borehole may be seen in the following U.S. Patents: Moran et al, U.S. Pat. No. 3,732,947; Liben, U.S. Pat. No. 3,175,639; Zemanek, U.S. Pat. No. 3,340,953; Norel et at, U.S. Pat. No. 3,883,841; McDonald, U.S. Pat. No. 3,339,665; and, Kaule, U.S. Pat No. 3,741,334.

Most recently, Havira, U.S. Pat. No. 4,255,798 has described a system utilized to measure cement bonding as well as casing thickness. Havira discloses several techniques which employ an acoustic pulse source with a frequency selected to stimulate a radial casing thickness into resonance. The acoustic pulse causes returns or reflections which are formed by reflections from the various interfaces between media of different acoustic impedances. Analysis of these returns by Fast Fourier Transform and integration techniques is then utilized to determine the frequency, as well as energy content of these signals. Casing thickness and cement bond quality may then be determined by an analysis of this data.

Despite the multitude of techniques described in the prior art for acoustic investigation of casing cement bond and casing thickness, those ordinarily skilled in the art will appreciate that a more precise method which permits more accurate measurement of both casing thickness and casing cement bond is greatly desired. The tool utilized in the method of the present invention includes nine sonic transducers which each transmit a five microsecond pulse occupying a band of frequencies from two hundred fifty kilohertz to seven hundred kilohertz. Eight of these transducers are mounted on the tool housing in a helical array, with each transducer offset by forty-five degrees from an adjacent transducer and aimed to transmit a pulse normal to the wall of the casing.

The return signal generated with the described apparatus consists of a reflection from the inside surface of the casing and the reverberation signal from the wall of the casing. The decay rate of this reverberation signal is related to the quality of the bond between the cement on the outside of the casing and the casing itself. It can also be shown that this echo signal contains information which may be utilized to calculate the thickness of the casing. Indeed, the frequency of this reverberation is determined by the casing thickness, utilizing the sound velocity in steel.

A ninth transducer is utilized in a preferred mode of the present invention and transmits a pulse along the axis of the tool to a fixed reflector which is mounted at a known distance. The sound velocity and mud attenuation may then be determined for reference information.

The most obvious known technique for measuring the frequency of a short duration signal is the application of a Fast Fourier Transform or the utilization of a counter circuit, as disclosed in the prior art. However, such techniques do not yield a desired level of accuracy. The method and apparatus of the present invention utilizes an autoregressive adaptive filter which requires significantly less computing time and which yields a more accurate frequency determination, even when more than one signal frequency is present. Also, such a filter may be utilized to determine the damping rate of the reflection signal and therefore may be utilized to generate data which may be used to determine the quality of the casing cement bond.

SUMMARY OF THE INVENTION

It is therefore one object of the present invention to provide an improved acoustic method for determining selected characteristics of a casing cemented in a borehole.

It is another object of the present invention to provide an improved apparatus for determining selected characteristics of a casing cemented in a borehole utilizing acoustic techniques.

It is still another object of the present invention to provide an improved apparatus for determining the thickness of a casing cemented in a borehole utilizing acoustic techniques.

It is yet another object of the present invention to provide an improved apparatus for determining the quality of the bond between cement and casing in a casing cemented into a borehole utilizing acoustic techniques.

The foregoing objects are achieved as is now described. A sonde is provided which is adapted to be lowered into a borehole and which includes a plurality of acoustic transducers arranged in a helical array around the sonde. A short duration accoustic pulse is directed at the borehole casing from each transducer and the reflection signal generated thereby is coupled to an autoregressive adaptive filter which automatically adjusts its filter coefficients to achieve a desired output signal. The adjusted filter coefficients are then utilized to determine the frequency and energy of the reflection signal and the frequency and energy of the reflection signal may be utilized to determine selected characteristics of the casing and the cement bond. In a preferred embodiment of the present invention, an additional transducer is mounted a selected distance from a fixed reflector to obtain standard transmission characteristics.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein;

DETAILED DESCRIPTION OF THE PREFERRED EMBODIMENT

Figure 1:
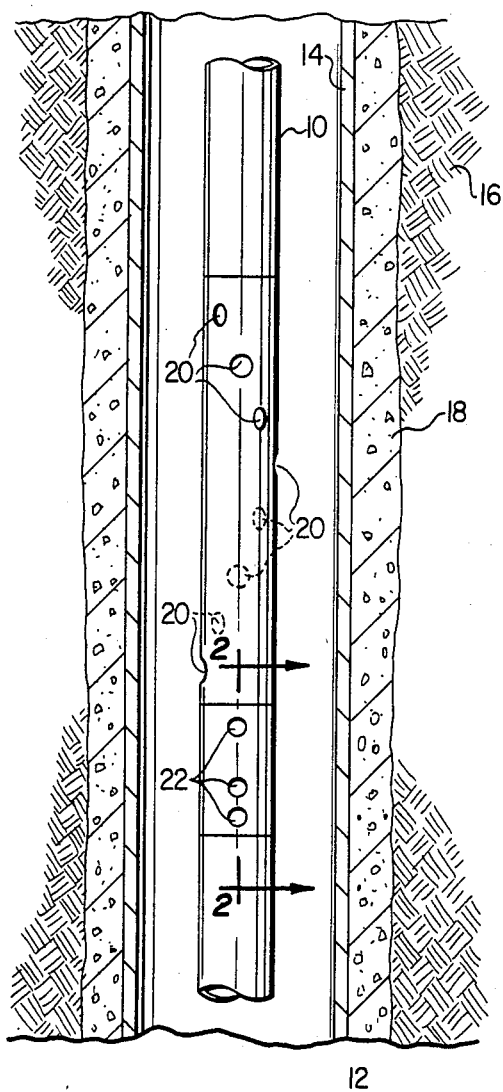
FIG. 1 is a partially schematic view of a sonde which may be utilized in the present invention.

With reference now to the figures and particularly with reference to FIG. 1 there is depicted a partially schematic view of a sonde which may be utilized in the present invention.

As may be seen, sonde 10 is shown suspended in a borehole 12 by means of a cable, not shown, which preferably includes a plurality of electrical conductors utilized to couple control signals to sonde 10. Borehole 12 also includes a casing 14 which is set into formation 16 utilizing cement 18.

Sonde 10 serves to mount a plurality of sonic transducers 20. Sonic transducers 20 are preferably spaced, as depicted, in a helical array wherein each transducer is separated from an adjacent transducer by approximately 45 degrees. Transducers 20 are preferably acoustic pulse transducers and the standoff distance from each transducer 20 to casing 14 is preferably greater than or equal to 1.4 inches. This distance permits a sufficient time for the reverberation signal generated in response to a pulse transmitted by a transducer 20 to arrive back at that transducer 20 before secondary reflections occur. In the depicted embodiment of the present invention, transducers 20 are excited in a sequence which permits casing 14 to be examined every six inches along its entire length. Additionally, the spacing of transducers 20 permits casing 14 to be examined every 45 degrees around its entire circumference.

Figure 2:
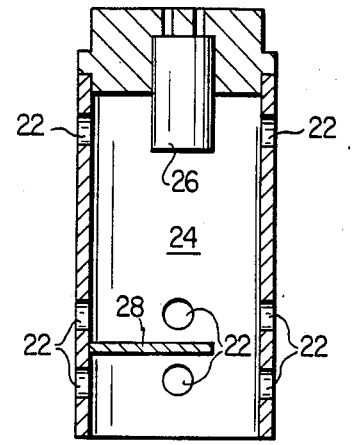
FIG. 2 is a sectional view of the sonde of FIG. 1 taken along lines 2—2.

Also depicted in FIG. 1 are apertures 22 which serve to permit drilling mud to circulate within an internal chamber of sonde 10. Referring now to FIG. 2, there is depicted a sectional view of sonde 10 along line 2—2 of FIG. 1 which illustrates the purpose of apertures 22. As can be seen, apertures 22 permit drilling fluid to circulate within chamber 24 inside sonde 10. Also mounted within chamber 24 is a ninth transducer 26 which is fixedly mounted a selected distance from fixed reflection plate 28. Transducer 26 is periodically excited to generate a pulse which is reflected from plate 28 and is received back at transducer 26 to permit standard sound velocity and attenuation values to be determined.

Figure 3:
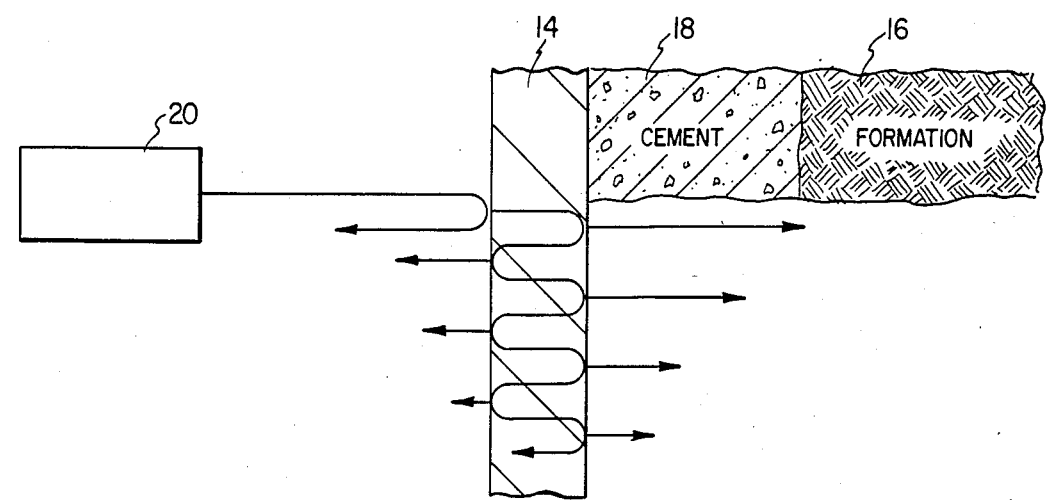
FIG. 3 is a partially schematic drawing which depicts the origin of the reflection signals which may be processed utilizing the method of the present invention.

With reference now to FIG. 3, there is depicted a partially schematic drawing which depicts the origin of the reflection signals which are processed utilizing the method and apparatus of the present invention. As can be seen, the acoustic pulse generated by each transducer 20 is transmitted at casing 14. The signal which arrives at casing 14 is partially reflected and partially transmitted into casing 14. Thereafter, each time that signal intersects an interface between two materials of differing acoustic transmission characteristics, the signal is partially reflected and partially transmitted.

Figure 4A:
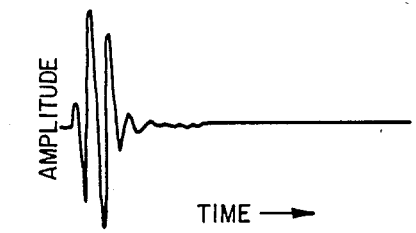
FIG. 4a, 4b, and 4c depict amplitude and phase diagrams of typical signal wave forms encountered in a casing which has been poorly bonded.
Figure 4B:
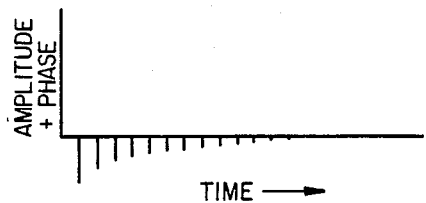
Figure 4C:
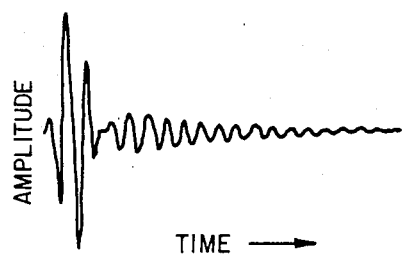

Referring now to FIGS. 4a, 4b and 4c, there are depicted amplitude and phase diagrams of the various signals depicted in FIG. 3. FIG. 4a depicts an amplitude diagram of the pulse transmitted periodically by each transducer 20. FIG. 4b depicts an ideal amplitude and phase diagram for the echo signal which is generated in response to the pulse of FIG. 4a and FIG. 4c depicts an amplitude diagram of an actual received signal detected by a transducer 20 in response to the generation of a pulse. As may be seen, the transmit pulse depicted in FIG. 4a is much longer in duration than the time spacing of the echo signals depicted in FIG. 4b. As a result, the actual received signal depicted in FIG. 4c will appear to be a large amplitude replica of the transmit pulse of FIG. 4a followed by a damped sinusoid. The period of this damped sinusoid is equal to the spacing of the reflections. The reflection spacing is equal to twice the travel time of sound through the casing well, and the frequency may be expressed by:

$$f = V/2T$$

where V is the compressional wave velocity in steel and T is the thickness. The casing thickness may therefore be computed from the frequency of the damped sinusoid.

Known techniques of measuring this frequency have utilized a Fourier transform or some other similar computational technique to obtain a frequency spectrum of the signal. Because of the phase reversal in the reflection, this spectrum will show a notch at the frequence corresponding to the casing thickness. The accuracy in measuring the frequency of this notch is limited by the Fourier transform's inherent frequency accuracy of $1/\tau$ where $\tau$ is the time duration of the signal analyzed. Certain techniques may be utilized to improve the resolution; however, these techniques increase computational time and the noise present in the measured signal.

Figure 5:
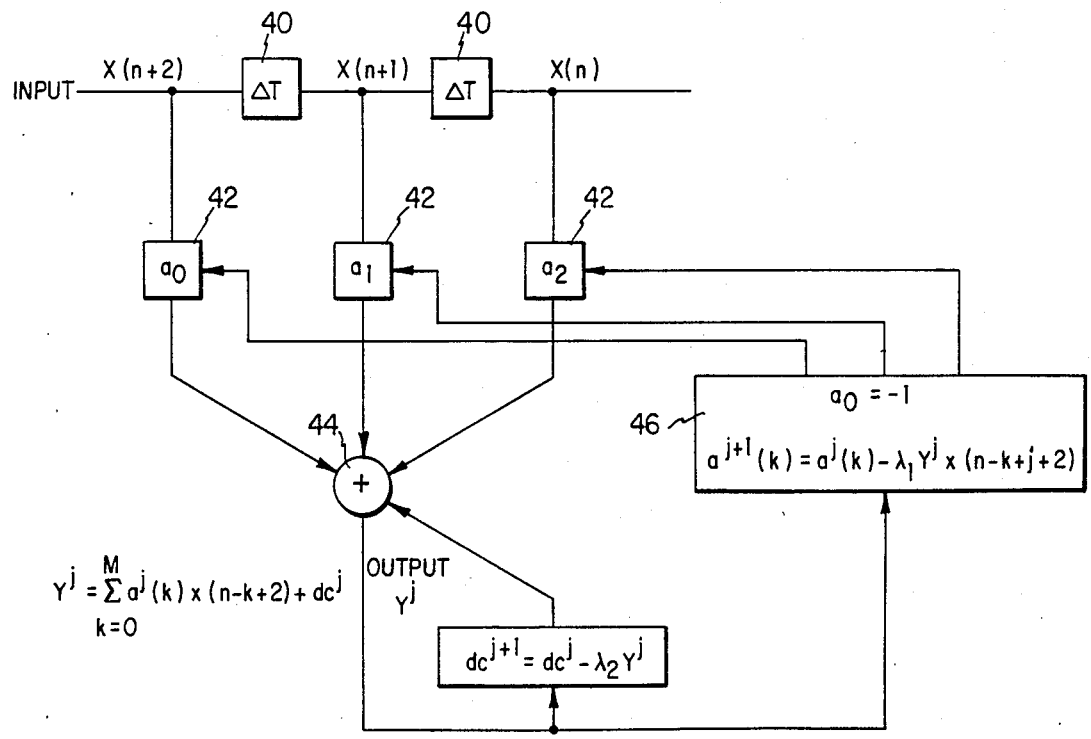
FIG. 5 depicts in block diagram form an autoregressive adaptive filter which may be utilized in the method of the present invention.

With reference now to FIG. 5, there is depicted a schematic representation of an adaptive filter which may be utilized to analyze the received signal to determine both the frequency of the damped sinusoid as well as its exponential decay rate. The analysis scheme of the present invention is based upon the assumptions that the number of frequencies present in the received signal is limited and that the absolute amplitude of these signals does not need to be determined.

There is depicted in FIG. 5, a general schematic representation of an adaptive filter which may be utilized in the present invention. As can be seen, the adaptive filter includes a tapped delay line, variable weights and a signal summer. A recursive gradient optimization utilizing the method of steepest descent is employed to control and adjust the filter parameters. Feedback is employed to control the response of the filter to the signal in an adaptive filter rather than to control the signal. The filter parameters may then be employed to determine the signal present at the input of the filter.

It may be observed that for a given damped sinusoid which is sampled at equal time intervals, a simple predictive algorithm yields the amplitude at a given time employing only the two preceding data points. Indeed, for a signal of the form:

$$x(t) = e^{-\alpha t} \sin(\omega t) \quad (1)$$

it may be easily shown that
$$x(t+2T) = -e^{-2\alpha T}x(t) + 2e^{-\alpha T}\cos(\omega T x(t+T))$$

where T is the sampling time interval.

In actual practice we seek to determine $\alpha$ and $\omega$, where $\omega$ is the resonant frequency of the casing and $\alpha$ is the attenuation factor related to the quality of the bonding of the casing to cement. Therefore we assume a general expression for the predictive algorithm for the given signal of the form:

$$X(n) - a_1 X(n-1) + a_2 X(n-2) \quad (3)$$

where X(n) represents the amplitude of the signal at sample n. Rewriting equation (3) as $$X(n) - a_1 X(n-1) - a_2 X(n-2) = 0 \quad (4)$$

the corresponding transformation can be viewed as a filter whose z-transform is $$H(z) = z^2 - a_1 z - a_2 \quad (5)$$

The actual system x(t), represent by a damped sinusoid has the following z-transform $$X(z) = \frac{z e^{-\alpha T}\sin(\omega T)}{z^2 - 2z e^{-\alpha T}\cos(\omega T) + e^{-2\alpha T}} \quad (6)$$

where, here again, T is the sample period. We wish to achieve:

$$H(z) \cdot X(z) = 0 \quad (7)$$

If, we now select the filter coefficients such that the zeroes of equation (5) are the same as the zeroes of the denominator in equation (6), then we would have satisfied equation (7). By inspection we have $$a_1 = 2e^{-\alpha T}\cos(\omega T) \quad (8)$$

$$a_2 = -e^{-2\alpha T} \quad (9)$$

Hence, in order to determine the casing resonant frequency and the bonding related damping coefficient $\alpha$, it suffices to determine $a_1$ and $a_2$.

We proceed by an iterative process starting with values for $a_1$ and $a_2$ corresponding to the best guess as to the actual casing thickness and bonding. The iterative process itself is the digital filter shown in FIG. 5. This is an all zero filter which has a difference equation relating the output to the input by $$Y(n) = \sum_{k=0}^{M} a_k x(n = k + 2) \quad (10)$$

For our particular application, M=2 and $a_0 = -1$. Adaptive filters such as those described in the literature use a recursive algorithm to modify the filter coefficients. This recursive technique uses successive samples of the signal to increment the coefficients towards the correct value. A least-mean-square algorithm may be utilized to find an estimate of the gradient towards the correct solution. This estimate of the gradient is found by taking the derivative with respect to the filter coefficients of the square of the output. This derivative is given by $$\frac{\partial y^2}{\partial A^j} = 2y^j x(n - k + j + 2) \quad (11)$$

where j is the iteration number.

Then the coefficients are modified in the direction of the steepest descent by:

$$a^{j+1}(k) = a^j(k) - \lambda_1 Y^j \times (n - k + j + 2) \quad (12)$$

where $\lambda_1$ is a convergence parameter which absorbs the 2 and which controls the stability and rate of adaptation.

There is also a secondary adaptation loop used for the case of real data. The initial assumption the time wave contained only zero mean signals is not true in a practical situation. Offset voltages in amplifiers lead eventually to a signal having a small dc offset which can vary with time. A secondary loop is formed to adaptively cancel any dc offset in the signal. The adjustment is made using $$dc^{j+1} = dc^j - \lambda_2 y^j \quad (13)$$

where $dc^{j+1}$ is the next value of the dc estimate and $\lambda_2$ is a coefficient used to adjust the rate of convergence. When a block of data has been shifted through the filter, the coefficients then may be used to estimate the input signal using equations (8) and (9). Both the frequency and damping factor of the waveform may be determined using this technique.

Indeed, from equations (8) and (9)

$$\omega = \frac{1}{T}\cos^{-1}\left(\frac{-a_1^2}{4a_2}\right)$$

$$\alpha = -\frac{1}{2T}\text{Ln}(-a_2)$$

This processing technique will also find the fundamental and second harmonic when thicker casings are examined. The order of the filter in this case is 4.

A third order filter may also be implemented constraining the value of $a_3$ to $-1$. This increase in order improves the signal-to-noise characteristics of the process.

Several different techniques may be used to determine the signal after the filter coefficients are determined. Among these techniques are: direct computation; the utilization of look-up tables; and, by utilizing the zeroes and residuals in the transfer function.

Figure 6:
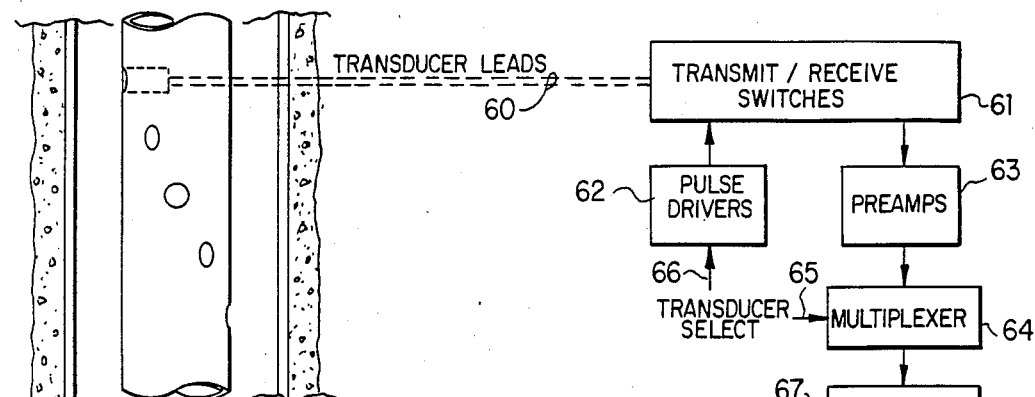
FIG. 6 is a block diagram depicting the signal processing system of the present invention.

Referring now to FIG. 6, there is depicted a block diagram of the system of the present invention.

Signal leads are brought back into the electronics housing and are connected to the transmit/receive switches 61. These allow the common connection of a transmitter 62 which produces a 500 v pulse to a transducer and a few microseconds later be able to use a preamp 63 to detect a 100 $\mu$v signal being received by the transducer. In this embodiment, nine separate transmitters are used and nine receivers are used. In another embodiment, one transmitter and one receiver may be used with each transducer being switched into the circuit. An analog multiplexer is used to select the proper preamp signal for further amplification. This choice is made by the transducer select line 65. The similar control line also chooses the correct transducer pulse firing circuit. The signal now goes to a variable gain amplifier 66 which has a gain selected by a control line 67. The gain control allows compensation for changes in mud attenuation, casing roughness, eccentering of the tool, and transducer variations. A large change in gain is required to allow observation of the internal reflection in the casing with maximum resolution. The digitizer has 8 bit resolution and digitizes at 5 MHz. The timing control fixes the digitizing rate and starts and stops the digitizing. Power is removed from the digitizer when it is not being used to reduce power consumption. The memory 70 is used to store the data at the rate it is digitized and then deliver it to the telemetry at the rate it can be transferred uphole via the telemetry 72. The control line to the memory is used to tell it whether to read or write and which address to begin with when transferring data uphole. The uphole telemetry 74 interfaces the logging cable 83 to the micro computer 75. The micro computer controls the downhole tool so as to acquire the signature of the internal reflection at the desired locations in the casing. The micro computer then generates a log indicating the thickness of the casing in 45° increments around the casing at selected depths and also generates a log indicating the cement bonding around the casing at the same location. This log is generated using a dot matrix printer 76.

The micro computer is programmed to perform several basic functions to enable the acquisition of data at the correct location and with the proper amplitude and timing.[2] A depth counter (77) is provided so that the computer can control the transmitting of each transducer so that the correct transducer is selected in the firing control logic 78. With each transmit cycle, the data is analyzed by the computer to determine the range to the casing and select the proper gain setting for the variable gain amplifier 66. The eventual outcome of the firing sequence of each particular transducer is a set of 64 data points sampled at 5 MHz with the maximum possible gain and windowed in time so as to contain only the signal due to the reflection within the casing. This signal is then passed to the adaptive filter processor 80 which calculates the correct filter parameters which best represent the signal. These values are then used to calculate the cement bonding and casing thickness 81. These values, along with the depth information, are used to produce a log 82 on the printer 76.

Figure 7:
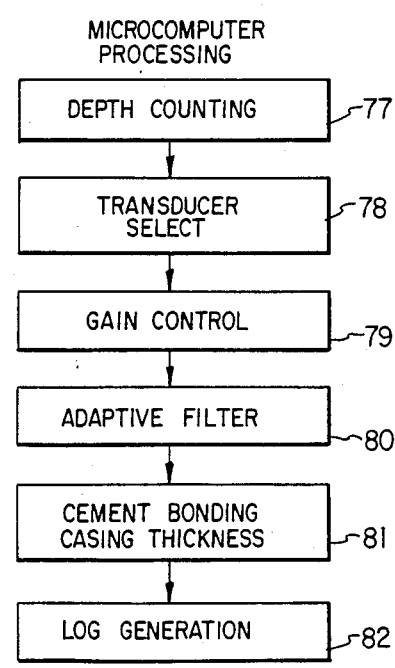
FIG. 7 shows a block diagram of the signal processing scheme used to develop a log.

[2] FIG. 7 shows the logic used to acquire data and produce a log.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A method for determining a selected characteristic of a casing cemented in a borehole penetrating an earth formation from a reflection signal from an acoustic pulse directed from within the casing at a radial segment thereof comprising the steps of:
   selecting from the reflection signal a reverberation segment substantially representative of acoustic reverberations between the casing walls at said radial segment;
   selecting from said reverberation segment an input signal, a first time delayed signal, and a second time delayed signal;
   multiplying said first and second time delayed signals by first and second filter parameters, respectively;
   adding (i) the product of said first time delayed signal and said first filter parameters, (ii) the product of said second time delayed signal and said second filter parameter, and (iii) the inverse of said input signal to obtain an output signal;
   selectively adjusting said first and second filter parameters to minimize said output signal; and
   utilizing at least one of said selectively adjusted adjustable filter parameters to determine said selected characteristic.

2. The method according to claim 1 wherein said selectively adjusting said first and second filter parameter step further comprises adjusting said first and second filter parameters in response to said output signal 3. An apparatus for determining a selected characteristic of a casing cemented in a borehole comprising:
   a sonde adapted to be lowered into said casing;
   transducer means disposed on said sonde for directing a short acoustic pulse at a radial segment of said casing;
   an adaptive filter having adjustable first and second filter parameters;
   means for detecting a reflection signal derived from said acoustic pulse
   means for selecting from said reflection signal an input signal, a first time delayed signal, and a second time delayed signal;
   means for coupling said first and second time delayed signals and said input signal to said adaptive filter to produce an output;
   means for adjusting said adjustable first and second filter parameters to obtain adjusted first and second filter parameters in response to said output of said adaptive filter so as to reduce said output; and
   means for for providing a signal indicative of said selected characteristic in response to at least one of said first and second filter parameters.

4. The apparatus for determining a selected characteristic of a casing cemented in a borehole according to claim 3 wherein said transducer means includes a plurality of transducers selectively spaced circumferentially around said sonde.

5. The apparatus for determining a selected characteristic of a casing cemented in a borehole according to claim 4 wherein said plurality of transducers comprise eight transducers.

6. The apparatus for determining a selected characteristic of a casing cemented in a borehole according to claim 5 wherein said eight transducers are disposed in a helical array, each separated from the next by an angle of forty-five degrees.

7. The apparatus for determining a selected characteristic of a casing cemented in a borehole according to claim 6 further including a ninth transducer mounted a fixed distance from a rigid reflector within said sonde whereby standard transmission characteristics may be determined.

8. The apparatus for determining a selected characteristic of a casing cemented in a borehole according to claim 3 wherein said adaptive filter comprises a fourth order adaptive filter.

9. The apparatus for determining a selected characteristic of a casing cemented in a borehole according to claim 3 wherein each of said adjustable first and second filter parameters is adjusted to achieve a particular output by utilizing a least mean square estimation.

10. The apparatus for determining a selected characteristic of a casing cemented in a borehole according to claim 3 wherein said selected characteristic comprises casing thickness.

11. The apparatus as claimed in claim 3, wherein:
said first filter parameter is a function of the frequency of said reverberation signal; and,
said second filter parameter is a function of the damping coefficient of said reverberation signal.

12. The apparatus as claimed in claim 11, wherein said selected characteristic is the thickness of said casing.

13. A method for determining a selected characteristic of a casing cemented in a borehole penetrating an earth formation from a reflection signal derived from an acoustic pulse directed from within said casing at a radial segment thereof comprising the steps of:
   a. selecting from said reflection signal a reverberation segment substantially representative of acoustic reverberations between the casing walls at said radial segment;
   b. selecting from said reverberation segment an input signal, a first time delay signal and a second time delay signal;
   c. multiplying said first time delay signal by a first filter parameter;
   d. multiply said second time delay signal by a second filter parameter;
   e. adding the results of steps (c) and (d) to the inverse of the input signal to obtain an output signal;
   f. using the output signal to determine adjusted first and second filter parameters;
   g. repeating steps (b) through (f) with adjusted first and second filter parameters until the output signal reaches a desired minimum; and,
   h. using at least one of the adjusted first and second parameters to determine said selected characteristic.

14. The method as claimed in claim 13, wherein:
said first filter parameter is a function of the frequency of said reverberation segment; and,
said second filter parameter is a function of the damping coefficient of said reverberation segment.

15. The method as claimed in claim 1, wherein said selected characteristic is thickness of said radial segment.

16. The method as claimed in claim 14, wherein said selected characteristic is quality of cement bond of said radial segment.

17. The method as claimed in claim 13, wherein step (e) includes the further step of adding to the results of steps (c) and (d) and the inverse of the input signal a dc correction factor.

18. The method as claimed in claim 13, wherein step (f) includes adjusting said first and second filter parameters by a least mean square estimation.

* * * * *